April 24, 1934. L. S. MARCHIONY 1,955,817
IMPROVED ICE CREAM MOLD
Filed Dec. 5, 1931
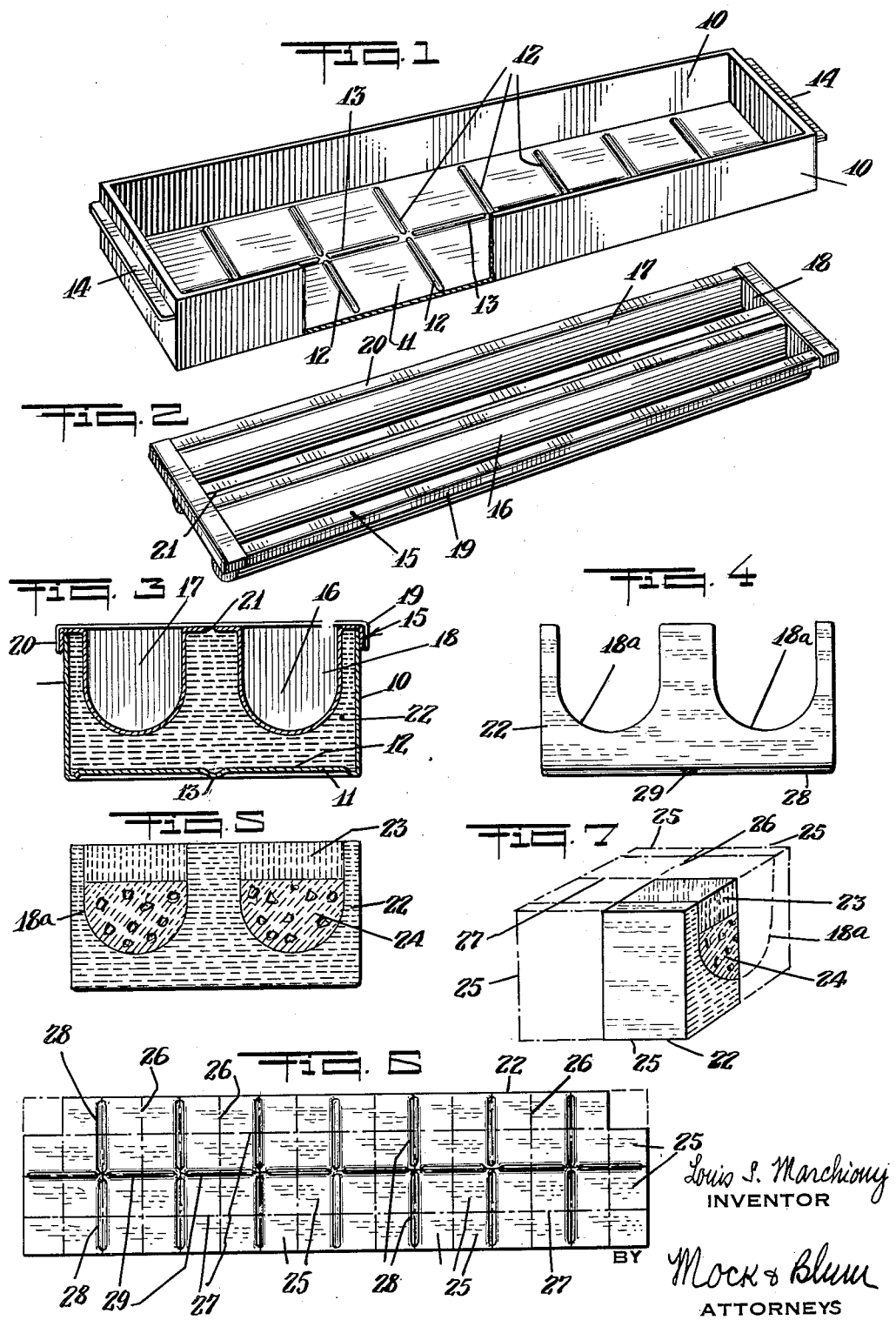
Louis S. Marchiony
INVENTOR
BY Mock & Blum
ATTORNEYS Patented Apr. 24, 1934

1,955,817

UNITED STATES PATENT OFFICE 1,955,817

IMPROVED ICE CREAM MOLD

Louis S. Marchiony, New York, N. Y.

Application December 5, 1931, Serial No. 579,160

4 Claims. (Cl. 107—1)

This invention relates to an improved mold and process for the manufacture of particular forms of ice cream and more particularly to an improved mold and method for the manufacture of the particular ice cream known as spumoni.

A particular object of this invention is the provision of an improved mold and method for the manufacture of special ice cream, such as spumoni, so that same can be made by speedy manufacturing methods with a minimum of hand labor.

Further objects of the invention will be apparent from the specification and drawing in which Fig. 1 is a perspective view with the wall partly broken away showing the outside mold used in my improved method for making spumoni.

Fig. 2 is a perspective view of the top of the mold.

Fig. 3 is a sectional view of the complete mold in position with the ice cream therein.

Fig. 4 is an end elevation of the frozen ice cream as removed from the mold.

Fig. 5 is a section of the frozen ice cream in which grooves shown in Fig. 4 have been filled with additional ice cream products.

Fig. 6 is a bottom plan view of the ice cream as removed from the mold.

Fig. 7 is a perspective view of an individual portion of the frozen spumoni product showing in dotted lines the rectangular portion of the slab of frozen product from which the individual portion is cut.

10 indicates the walls of the end portion of the mold; 11 is the bottom of the mold, 12 and 13 being the transverse and longitudinal indentations in the bottom which divide the bottom into squares. 14 are the handles on the lower portion of the mold. 15 is the upper mold having the longitudinal grooves 16 and 17, the ends 18, and the sides 19 and 20 indicate the longitudinal top portions of the frame of the lower mold. 21 is an open slot in the upper mold which provides the necessary space for the liberation of air from the ice cream in the process of hardening and prevents the formation of air pockets in the hardened ice cream.

22 is the ice cream frozen in the lower mold, 23 being a different variety of ice cream from that shown in 22, and 24 indicating a still different flavor of ice cream which with 23 fill the grooves 18a shown in Fig. 4. 25 represents the rectangular portion of the brick contained between two of the transverse indentations in the mold, the dividing lines being indicated by 26 and 27. 28 and 29 are the indentations formed in the ice cream itself by the ribs 12 and 13 in the lower mold.

In the manufacture of the special ice cream known as spumoni, the body of the ice cream is generally made of vanilla ice cream or ice cream of ordinary texture and this ice cream is filled with a plurality of flavored frozen products, differing in flavor and usually in consistency from the ice cream constituting the body of the frozen product. The mass of ice cream filling my improved mold is initially made and frozen in a large freezer by ordinary methods not here illustrated, and the molds herein shown are for the purpose of hardening this ice cream after the initial freezing has been performed.

Hitherto these filled ice creams have been molded by hand involving a considerable amount of labor with a consequent increase in the expense of production and in this invention I have provided means of making these special filled ice creams in special molds with a minimum of hand labor.

My improved method of making filled ice creams is as follows:

The rectangular mold shown in Fig. 1 is filled with a material constituting the body of the ice cream, for example with the constituents for vanilla ice cream, and it should be noted that on account of the shape of the cover for said mold, the mold shown in Fig. 1 is only partially filled. The cover shown in Fig. 2 is then inserted and the result is shown in cross-sectional view in Fig. 3.

The slot 21 is important to properly freeze the body of the ice cream as this provides a vent for any air in the ice cream as it is being hardened so that the consistency of the ice cream is the same throughout, and the possibility of having air pockets in the mass is obviated. When the body of the ice cream has been properly hardened, it may be easily liberated from the mold by dipping the mold in water and then a frozen body is secured of the shape shown in Fig. 4.

Into the grooves 18a is then inserted a semi-liquid mass which will form another layer of ice cream and is marked 24 in the drawing and on top of this semi-liquid mass there is poured another ice cream product also of semi-liquid consistency with a flavor different from that shown as 24, this top layer being marked 23. 23 and 24 are ice creams more in the nature of masses, which are easily frozen, and after these have been put into the grooves of the body of ice cream 22, the entire mass is then refrigerated until 23 and 24 are properly frozen. When this has been accomplished, the mass is ready for cutting.

A section of the frozen product is shown in Fig. 7 which also illustrates a single serving portion of the same, each portion having therein part of the original body and part of the two fancy forms of ice cream 23 and 24.

It may be evident that the molds shown in Fig. 1 will provide sixty-four individual portions of spumoni or similar ice creams.

It is also apparent that changes may be made in the form of the mold and in the form of the constituents manufactured or hardened therein without departing from the spirit of my invention.

Having fully described my invention, what I claim is:

1. A mold for frozen products comprising a rectangular body having a series of transverse and longitudinal indentations in the bottom thereof, and a cover for said mold having a plurality of longitudinal grooves therein and means in said top providing for the escape of air imprisoned in said mold, said means comprising a longitudinal opening intermediate said longitudinal grooves.

2. A mold for frozen products comprising a rectangular body having a series of indentations in the bottom thereof to define portions of the finished product, and a cover for said mold having a plurality of longitudinal grooves therein, said grooves extending more than half way into the interior of said mold, and means in said cover for the escape of air imprisoned in said mold, said means comprising a longitudinal opening intermediate said longitudinal grooves.

3. A mold for frozen products comprising a rectangular body, and a cover for said mold having a plurality of longitudinal grooves therein, said grooves extending more than half way into the interior of said mold, and means in said cover providing for the escape of air imprisoned in said mold, said means comprising a longitudinal opening intermediate said longitudinal grooves.

4. A mold for frozen products comprising a rectangular body having a series of markings in the bottom thereof to define portions of the finished product, and a cover for said mold having a plurality of longitudinal grooves therein, said grooves extending more than half way into the interior of said mold, and means in said cover for the escape of air imprisoned in said mold, said means comprising a channel in said mold intermediate said grooves.

LOUIS S. MARCHIONY.